US012043946B2

(12) United States Patent
Zhao et al.

(10) Patent No.: US 12,043,946 B2
(45) Date of Patent: Jul. 23, 2024

(54) ATOMISING GENERATOR, CLOTHING TREATMENT DEVICE, AND CONTROL METHOD THEREFOR

(71) Applicants: QINGDAO HAIER WASHING MACHINE CO., LTD., Shandong (CN); Haier Smart Home Co., Ltd., Shandong (CN)

(72) Inventors: Zhiqiang Zhao, Qingdao (CN); Sheng Xu, Qingdao (CN); Dejun Wang, Qingdao (CN); Zhongkai Zhuang, Qingdao (CN); Guangbin Sun, Qingdao (CN)

(73) Assignees: QINGDAO HAIER WASHING MACHINE CO., LTD., Qingdao (CN); HAIER SMART HOME CO., LTD., Qingdao (CN)

( * ) Notice: Subject to any disclaimer, the term of this patent is extended or adjusted under 35 U.S.C. 154(b) by 428 days.

(21) Appl. No.: 17/436,257

(22) PCT Filed: Mar. 2, 2020

(86) PCT No.: PCT/CN2020/077457
§ 371 (c)(1),
(2) Date: Sep. 3, 2021

(87) PCT Pub. No.: WO2020/177671
PCT Pub. Date: Sep. 10, 2020

(65) Prior Publication Data

US 2022/0154384 A1 May 19, 2022

(30) Foreign Application Priority Data

Mar. 5, 2019 (CN) ........................ 201910165011.8

(51) Int. Cl.
*D06F 39/40* (2024.01)
*B05B 17/06* (2006.01)
(Continued)

(52) U.S. Cl.
CPC .......... *D06F 39/40* (2024.01); *B05B 17/0676* (2013.01); *D06F 39/087* (2013.01);
(Continued)

(58) Field of Classification Search
CPC ...... D06F 39/02; D06F 39/008; D06F 39/088; D06F 39/087; D06F 2103/14; D06F 2105/40
See application file for complete search history.

(56) References Cited

U.S. PATENT DOCUMENTS 5,865,171 A * 2/1999 Cinquin ................ A61M 16/08 128/200.14
6,543,701 B1 * 4/2003 Ho ...................... B05B 17/0615 239/338

(Continued)

FOREIGN PATENT DOCUMENTS

CN 2884012 Y 3/2007
CN 101949578 A 1/2011

(Continued)

OTHER PUBLICATIONS

Electronic translation of JP-2009247770-A to Sasabe et al. (Year: 2009).*

(Continued)

*Primary Examiner* — Joseph L. Perrin
(74) *Attorney, Agent, or Firm* — Maier & Maier, PLLC

(57) ABSTRACT

An atomizing generator, a clothing treatment device, and a control method therefor to solve the problems of the structural complexity and poor liquid level measurement accuracy of existing atomizing generators. The atomizing gen-
(Continued)

erator includes an outer shell and an atomizing module, an atomization cavity capable of accommodating liquid being disposed in the outer shell, and a liquid inlet, an air inlet, and a mist outlet in communication with the atomization cavity being arranged on the outer shell, the atomizing module including an ultrasonic atomizing sheet, and the atomizing module being arranged to be capable of atomizing the liquid in the atomization cavity by vibration of the ultrasonic atomizing sheet and detecting the height of the liquid level in the atomization cavity by the vibration, which simplifies the structure of the atomizing generator and increases the precision and accuracy of liquid level measurement.

10 Claims, 10 Drawing Sheets

(51) Int. Cl.

| | |
|---|---|
| ***D06F 39/08*** | (2006.01) |
| *D06F 25/00* | (2006.01) |
| *D06F 33/32* | (2020.01) |
| *D06F 103/14* | (2020.01) |
| *D06F 105/40* | (2020.01) |

(52) U.S. Cl.

CPC ............ *D06F 39/088* (2013.01); *D06F 25/00* (2013.01); *D06F 33/32* (2020.02); *D06F 2103/14* (2020.02); *D06F 2105/40* (2020.02)

(56) References Cited

U.S. PATENT DOCUMENTS

| | | | | |
|---|---|---|---|---|
| 9,487,902 | B2 * | 11/2016 | Schulze | D06F 39/008 |
| 2006/0188646 | A1 | 8/2006 | Yun et al. | |
| 2006/0249144 | A1 * | 11/2006 | DeHaan | B05B 17/0615 128/200.14 |
| 2010/0051717 | A1 * | 3/2010 | Pei | B05B 17/0615 239/102.2 |
| 2015/0225887 | A1 * | 8/2015 | Schulze | D06F 39/008 8/137 |
| 2015/0299926 | A1 * | 10/2015 | Kim | D06F 21/02 8/137 |
| 2019/0193529 | A1 * | 6/2019 | Lechat | B05B 17/0615 |

FOREIGN PATENT DOCUMENTS

| | | | |
|---|---|---|---|
| CN | 104781462 | A | 7/2015 |
| CN | 106524373 | A | 3/2017 |
| CN | 206786891 | U | 12/2017 |
| CN | 108645485 | A | 10/2018 |
| CN | 210117537 | U | 2/2020 |
| JP | 2009072653 | A | 4/2009 |
| JP | 2009247770 | A * | 10/2009 |
| WO | 2018/050540 | A1 | 3/2018 |

OTHER PUBLICATIONS

International Search Report issued on Jun. 9, 2020 in corresponding International Application No. PCT/CN2020/077457; 6 pages.

* cited by examiner

ATOMISING GENERATOR, CLOTHING TREATMENT DEVICE, AND CONTROL METHOD THEREFOR

FIELD

The present disclosure relates to the technical field of clothing treatment, and in particular to an atomization generator, a clothing treatment apparatus and a control method therefor.

BACKGROUND

With the development of science and technology and the improvement of people's living standards, household appliances have more and more functions. Taking a washing machine as an example, many of the current washing machines also have a steam washing function (or referred to as air washing). The steam washing function is realized by an atomization generator. An atomization element in the atomization generator atomizes liquid into steam. Then, an atomization pipe sprays the steam into a washing tub to treat clothing in the tub, thereby realizing caring of the clothing, such as removing wrinkles and removing peculiar smells.

Typically, the atomization generator includes a housing, the housing is provided with an air inlet, a liquid inlet and a mist outlet, and an atomization element and a liquid level sensor for detecting a height of liquid level are arranged in the housing. In operation, the liquid level sensor controls an amount of water in the housing by detecting the height of the liquid level so as to prevent excessive or insufficient amount of water from causing overflow of water or damage to the atomization element. However, not only the arrangement of the liquid level sensor in the housing increases the structural complexity of the atomization generator, but also the liquid level sensor used in existing washing machines is greatly affected by the density and temperature of medium, and the accuracy is often poor.

Accordingly, there is a need in the art for a new atomization generator to solve the above problems.

SUMMARY

In order to solve the above problems in the prior art, that is, in order to solve the problems of complicated structure and poor accuracy of liquid level measurement existing in the existing atomization generators, the present disclosure provides an atomization generator including a shell and an atomization module; in which the shell is provided therein with an atomization cavity capable of containing a liquid, and the shell is provided thereon with a liquid inlet, an air inlet and a mist outlet, all of which communicate with the atomization cavity; the atomization module includes an ultrasonic atomization sheet, and the atomization module is configured to be capable of atomizing the liquid in the atomization cavity through vibration of the ultrasonic atomization sheet and detecting a height of liquid level in the atomization cavity through the vibration.

In a preferred technical solution of the above atomization generator, a water-permeable hole is provided at a bottom of the shell, the atomization module further includes an atomization sheet holder, and the ultrasonic atomization sheet is sealedly fixed to an outer part of the shell through the atomization sheet holder at a position corresponding to the water-permeable hole.

In a preferred technical solution of the above atomization generator, a partition is provided in the shell, and the partition divides the shell into an installation cavity and the atomization cavity; the installation cavity is provided therein with a controller, the atomization module further includes a drive circuit board for driving the ultrasonic atomization sheet, the drive circuit board is installed on the atomization sheet holder, and the controller is connected to the drive circuit board.

In a preferred technical solution of the above atomization generator, the liquid inlet is provided on a bottom surface of the atomization cavity, a flow stabilizing plate corresponding to the liquid inlet is further provided in the atomization cavity, and the flow stabilizing plate isolates the liquid inlet from the ultrasonic atomization sheet.

In a preferred technical solution of the above atomization generator, the flow stabilizing plate is formed by extending upward from the bottom surface of the atomization cavity, one side of the flow stabilizing plate is fixedly connected to one inner wall of the atomization cavity, and the other side of the flow stabilizing plate extends to another inner wall of the atomization cavity and forms a gap with said other inner wall.

In a preferred technical solution of the above atomization generator, the air inlet is arranged on the shell at a position corresponding to the installation cavity, and/or a fan is equipped at the air inlet, and the controller is further connected to the fan to control start and stop of the fan.

In a preferred technical solution of the above atomization generator, a communication cavity is further provided in the shell, the atomization cavity communicates with the communication cavity through a first communication hole, and the mist outlet communicates with the communication cavity through a second communication hole.

In a preferred technical solution of the above atomization generator, the mist outlet is arranged on a bottom surface of the shell, the atomization generator further includes a connection pipe, and the mist outlet communicates with the second communication hole through the connection pipe; and/or a valve mechanism is further provided in the communication cavity, the valve mechanism is configured to be capable of sealing the first communication hole and/or the second communication hole, and the controller is connected to the valve mechanism to control opening and closing of the valve mechanism.

The present disclosure also provides a clothing treatment apparatus, which includes a cabinet and a washing tub arranged in the cabinet; the clothing treatment apparatus further includes the atomization generator described in any one of the above preferred technical solutions, in which the liquid inlet communicates with a water source through a liquid inlet pipe and a solenoid valve, and the mist outlet communicates with the washing tub through a mist outlet pipe.

The present disclosure also provides a method for controlling a clothing treatment apparatus, in which the clothing treatment apparatus includes a cabinet, as well as a washing tub and an atomization generator that are arranged in the cabinet; the atomization generator includes a shell and an atomization module, the shell is provided therein with an atomization cavity capable of containing a liquid, and the shell is provided thereon with a liquid inlet, an air inlet and a mist outlet, all of which communicate with the atomization cavity; the liquid inlet communicates with a water source through a liquid inlet pipe and a solenoid valve, the mist outlet communicates with the washing tub through a mist outlet pipe, and the atomization module includes an ultrasonic atomization sheet which is capable of detecting a liquid level of the liquid in the atomization cavity through vibration and atomizing the liquid in the atomization cavity;

the control method includes:

controlling the solenoid valve to be opened;

at the same time as or after the solenoid valve is opened, controlling the ultrasonic atomization sheet to vibrate so as to detect a height of the liquid level in the atomization cavity;

judging whether the height of the liquid level reaches a set height; and selectively controlling the solenoid valve to be closed based on a judgment result.

It can be understood by those skilled in the art that in the preferred technical solutions of the present disclosure, the atomization generator includes a shell and an atomization module; the shell is provided therein with an atomization cavity capable of containing a liquid, and the shell is provided with a liquid inlet, an air inlet and a mist outlet, all of which communicate with the atomization cavity; the atomization module includes an ultrasonic atomization sheet, and the atomization module is configured to be capable of atomizing the liquid in the atomization cavity through vibration of the ultrasonic atomization sheet and detecting a height of liquid level in the atomization cavity through the vibration.

Through the above arrangement, the present disclosure greatly simplifies the structure of the atomization generator, and improves the precision and accuracy of liquid level measurement. Specifically, by using the ultrasonic atomization sheet as the atomization element, the liquid level measurement function and the atomization function are integrated in the ultrasonic atomization sheet, so that not only the height of liquid level in the atomization cavity can be measured through vibration, but also the liquid in the atomization cavity can be atomized, which greatly simplifies the structure of the atomization generator. When the liquid level needs to be measured, the ultrasonic atomization sheet works at a lower working frequency, and emits pulsed ultrasonic waves. The ultrasonic waves are reflected by a surface of the liquid and then received by the ultrasonic atomization sheet, and the height of the liquid level is calculated based on the time from emission to reception of the ultrasonic waves. The measurement principle of the above ultrasonic atomization sheet determines that it is less affected by liquid density, viscosity, temperature and the like during the measurement, so this measurement method can ensure the precision and accuracy of measurement. When atomization is required, the ultrasonic atomization sheet works at a higher frequency, and the molecular structure of the liquid water is broken up through high-frequency resonance to produce a naturally flowing water mist, which improves the clothing caring experience.

Further, the liquid inlet is arranged on the bottom surface of the atomization cavity, and a flow stabilizing plate is arranged in the atomization cavity at a position corresponding to the liquid inlet. The flow stabilizing plate isolates the liquid inlet from the ultrasonic atomization sheet, so that when the liquid enters the atomization cavity, the flow stabilizing plate can effectively suppress the splash generated when the liquid enters the atomization cavity, reduce fluctuation of the liquid level caused by the impact of water flow, and further improve the accuracy of detecting the liquid level by the ultrasonic atomization sheet.

BRIEF DESCRIPTION OF DRAWINGS

The atomization generator, the clothing treatment apparatus including the atomization generator, and the control method for the clothing treatment apparatus of the present disclosure will be described below with reference to the drawings and in conjunction with a drum washing machine. In the drawings.

DETAILED DESCRIPTION

Preferred embodiments of the present disclosure will be described below with reference to the accompanying drawings. It should be understood by those skilled in the art that these embodiments are only used to explain the technical principles of the present disclosure, and are not intended to limit the scope of protection of the present disclosure. For example, although this embodiment is described in conjunction with a drum washing machine, this is not intended to limit the scope of protection of the present disclosure. The present disclosure may also be applied to other clothing treatment apparatuses, such as a pulsator washing machine or a washing-drying integrated machine.

It should be noted that in the description of the present disclosure, terms indicating directional or positional relationships, such as “center”, “upper”, “lower”, “left”, “right”, “vertical”, “horizontal”, “inner”, “outer” and the like, are based on the directional or positional relationships shown in the accompanying drawings. They are only used for ease of description, and do not indicate or imply that the device or element must have a specific orientation, or be constructed or operated in a specific orientation, and therefore they should not be considered as limitations to the present disclosure. In addition, terms “first”, “second” and “third” are only used for descriptive purposes, and should not be understood as indicating or implying relative importance.

In addition, it should also be noted that in the description of the present disclosure, unless otherwise clearly specified and defined, terms “install”, “connect” and “connection” should be understood in a broad sense; for example, the connection may be a fixed connection, or may also be a detachable connection, or an integral connection; it may be a mechanical connection, or an electrical connection; it may be a direct connection, or an indirect connection implemented through an intermediate medium, or it may be an internal communication between two elements. For those skilled in the art, the specific meaning of the above terms in the present disclosure can be understood according to specific situations.

Figure 1:
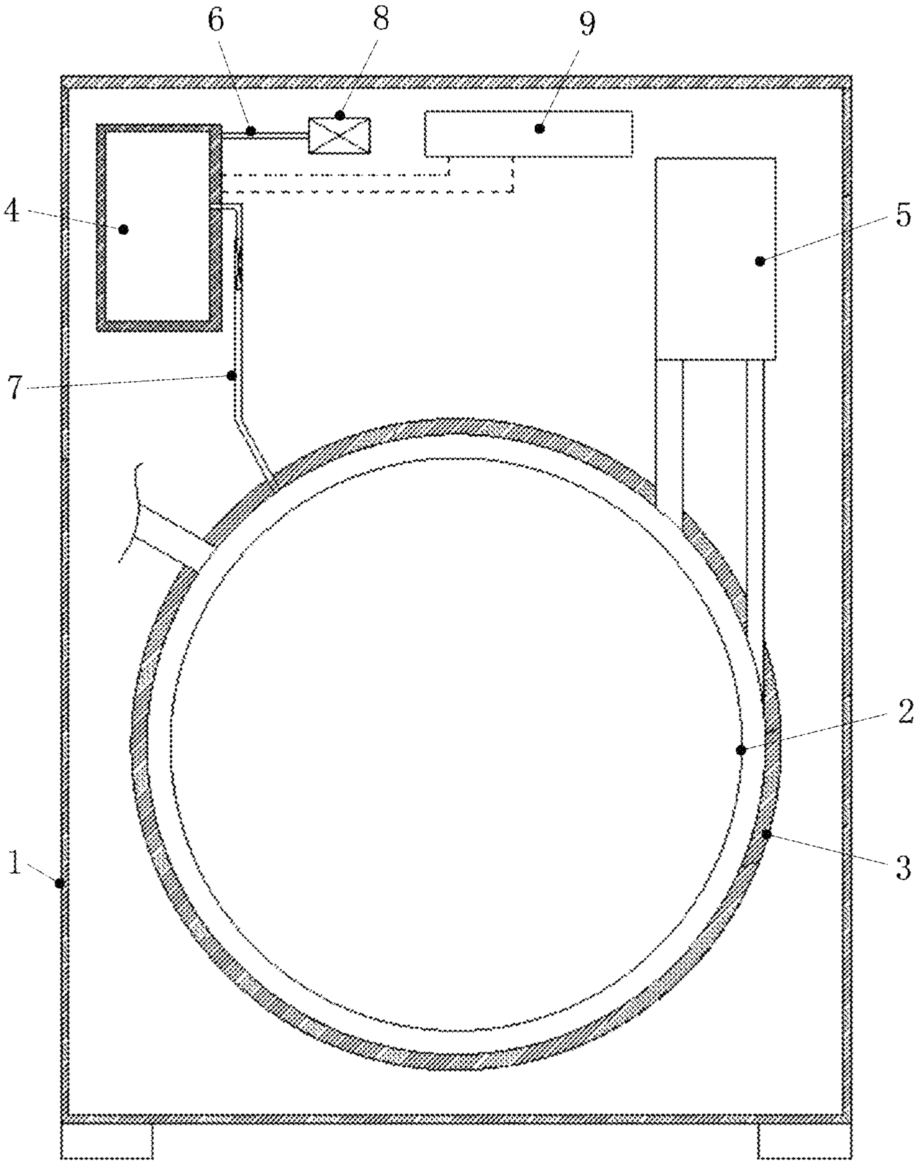
FIG. 1 is a schematic structural view of a drum washing machine of the present disclosure.
Figure 2:
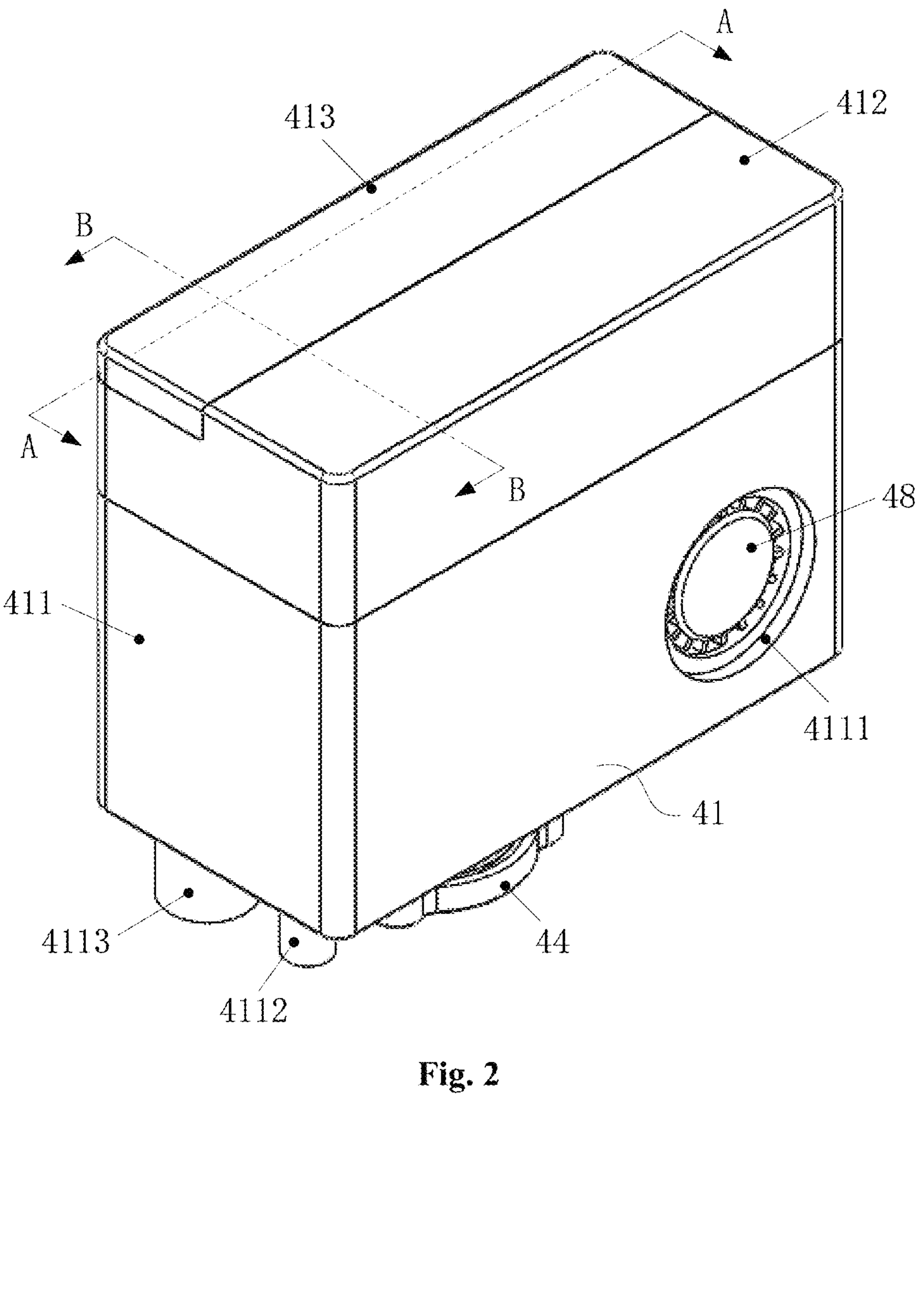
FIG. 2 is a first outline view of an atomization generator of the present disclosure.
Figure 3:
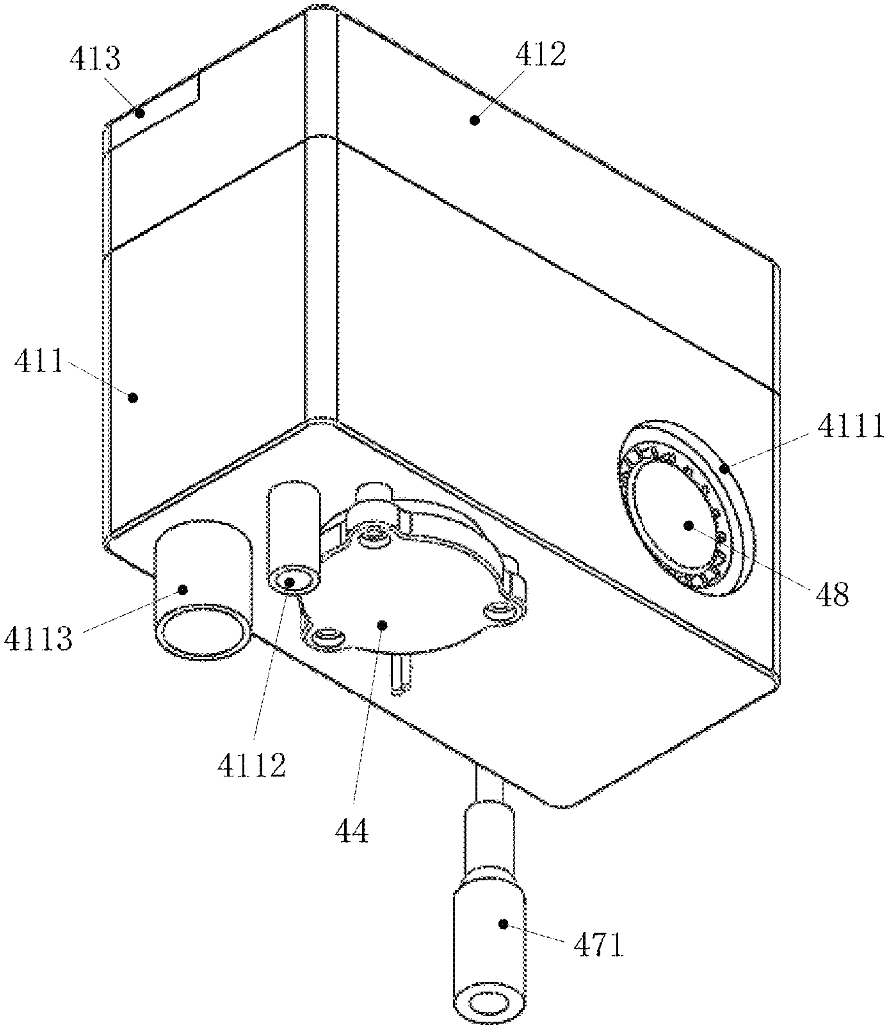
FIG. 3 is a second outline view of the atomization generator of the present disclosure.

First, referring to FIGS. 1 to 4, a drum washing machine of the present disclosure will be described. FIG. 1 is a schematic structural view of the drum washing machine of the present disclosure; FIG. 2 is a first outline view of an atomization generator of the present disclosure; FIG. 3 is a second outline view of the atomization generator of the present disclosure; and FIG. 4 is a structural view of an interior of a shell body of the atomization generator of the present disclosure.

As shown in FIG. 1, in order to solve the problems of complicated structure and poor accuracy of liquid level measurement existing in an existing atomization generator 4, the drum washing machine of the present disclosure mainly includes a cabinet 1, as well as an inner cylinder 2, an outer cylinder 3, an atomization generator 4, a drying module 5 and a control unit 9, all of which are provided in the cabinet 1. The inner cylinder 2 is configured to accommodate clothing, and the drying module 5 is in circulative communication with the outer cylinder 3 to dry the clothing in the inner cylinder 2 by providing hot air flow to the outer cylinder 3 and the inner cylinder 2. The atomization generator 4 communicates with a water source through a liquid inlet pipe 6 and a solenoid valve 8, and communicates with the outer cylinder 3 through a mist outlet pipe 7. When the atomization generator 4 is working, the water source enters the atomization generator 4 through the solenoid valve 8 and the liquid inlet pipe 6. After the atomization generator 4 atomizes the water into water mist, the water mist is sprayed to the inner cylinder 2 through the mist outlet pipe 7 and the clothing in the inner cylinder 2 is treated.

Figure 4:
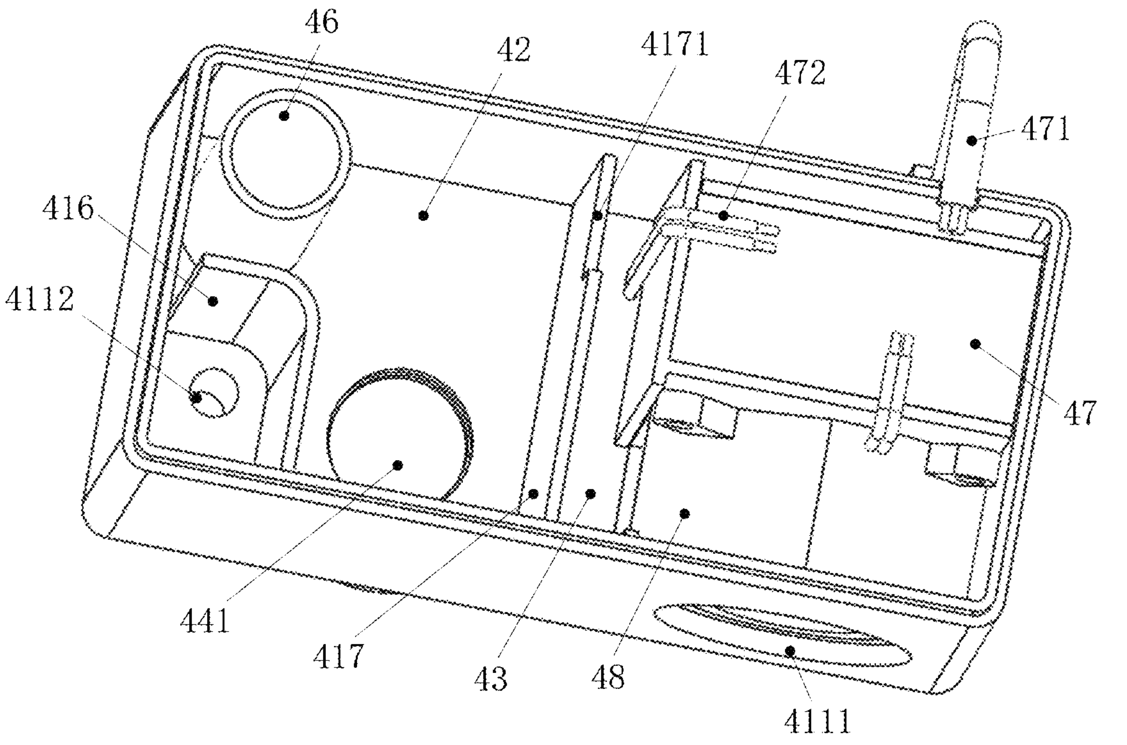
FIG. 4 is a structural view of an interior of a shell body of the atomization generator of the present disclosure.

With reference to FIGS. 2 to 4, the atomization generator 4 includes a shell 41, and an atomization module 44 capable of atomizing the liquid in an atomization cavity 42 into steam. A partition 417 is provided in the shell 41. The partition 417 divides the shell 41 into the atomization cavity 42 and an installation cavity 43 that communicate with each other. The atomization cavity 42 can contain the liquid. The shell 41 is provided with an air inlet 4111, a liquid inlet 4112 and a mist outlet 4113 that communicate with the atomization cavity 42. The liquid inlet 4112 is connected to the liquid inlet pipe 6, and the mist outlet 4113 is connected to the mist outlet pipe 7. The atomization module 44 includes an ultrasonic atomization sheet 441, which can atomize the liquid in the atomization cavity 42 through vibration and detect a height of liquid level in the atomization cavity 42 through vibration. A controller 47 is provided in the installation cavity 43. The controller 47 is connected to the control unit 9 through a cable 471, and is connected to the atomization module 44 through a control wire 472 to control start and stop of the ultrasonic atomization sheet 441.

Through the above arrangement, the present disclosure greatly simplifies the structure of the atomization generator 4, and improves the precision and accuracy of liquid level measurement. Specifically, by using the ultrasonic atomization sheet 441 as the atomization element, the liquid level measurement function and the atomization function are integrated in the ultrasonic atomization sheet 441, so that not only the height of liquid level in the atomization cavity 42 can be measured through vibration, but also the liquid in the atomization cavity 42 can be atomized, which greatly simplifies the structure of the atomization generator 4. Moreover, since the measurement principle of the ultrasonic atomization sheet 441 determines that it is less affected by liquid density, viscosity, temperature and the like during the measurement, this measurement method can ensure the precision and accuracy of measurement. Further, by providing the partition 417 in the shell 41, which divides the shell 41 into the atomization cavity 42 and the installation cavity 43, and by arranging the controller 47 which is connected to the ultrasonic atomization sheet 441 in the installation cavity 43, when the atomization generator 4 of the present disclosure leaves the factory, the controller 47 and the ultrasonic atomization sheet 441 are already assembled. Therefore, when assembling the drum washing machine, it is only required to install the atomization generator 4 to a set position inside the drum washing machine and insertedly connect the controller 47 to the control unit 9 by using the cable 471. The assembly process is extremely convenient, which greatly simplifies the assembly process and improves the assembly efficiency.

Figure 5:
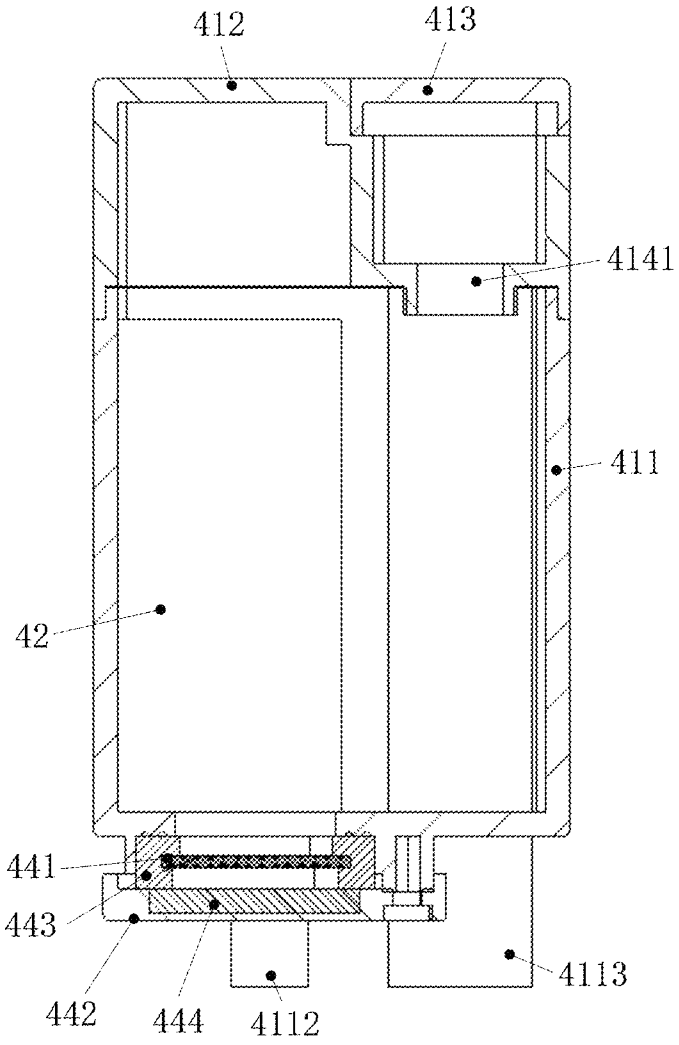
FIG. 5 is a sectional view of FIG. 2 taken along line B-B.
Figure 6:
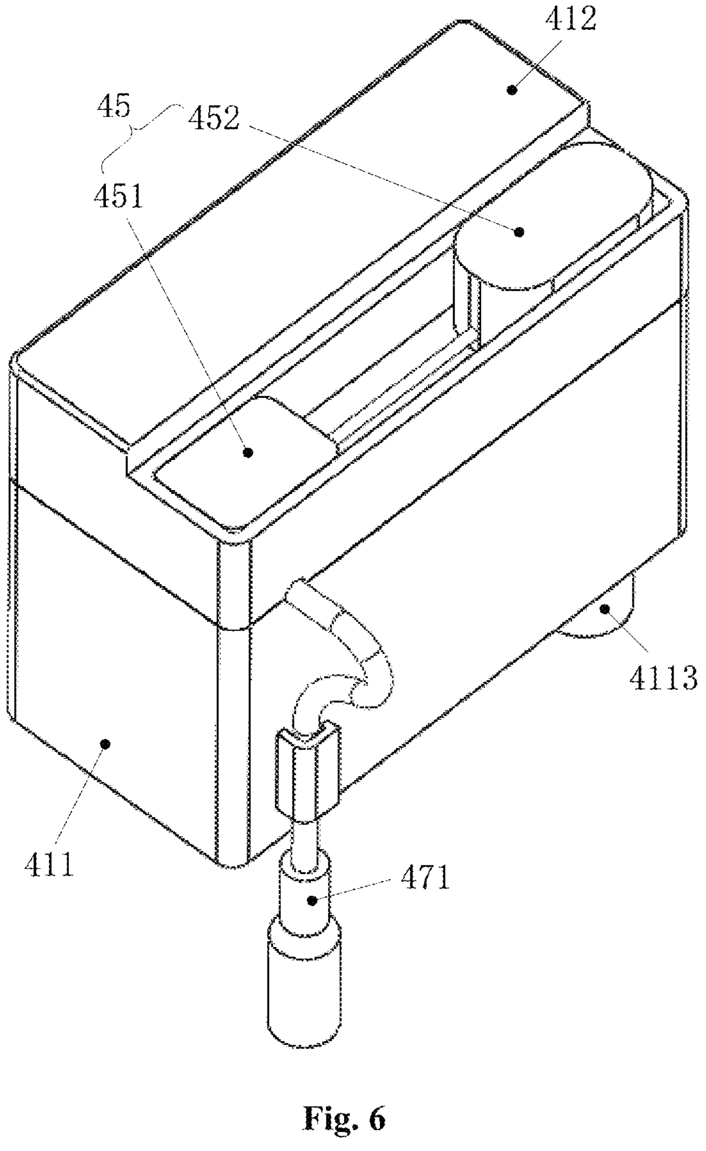
FIG. 6 is a structural view of the atomization generator of the present disclosure after a second shell cover is removed.
Figure 7:
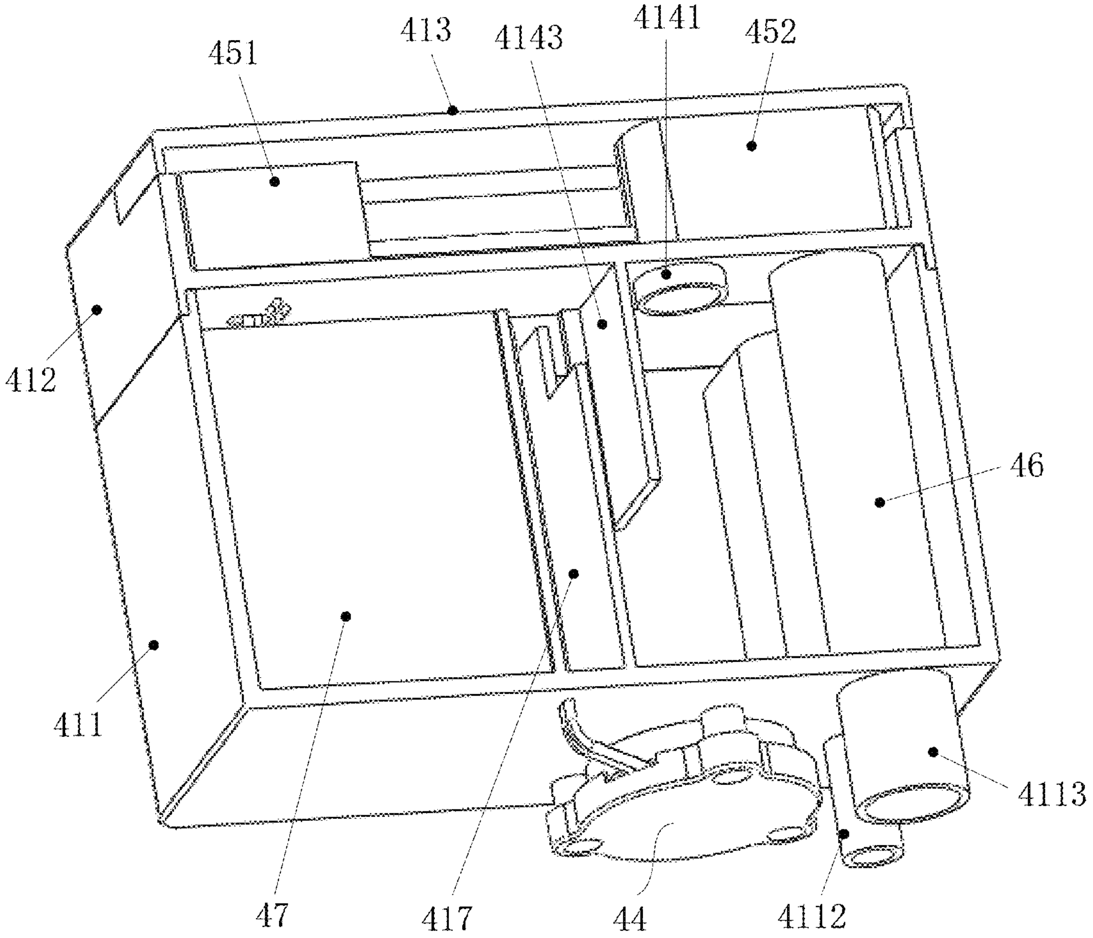
FIG. 7 is a sectional view of FIG. 2 taken along line A-A.
Figure 8:
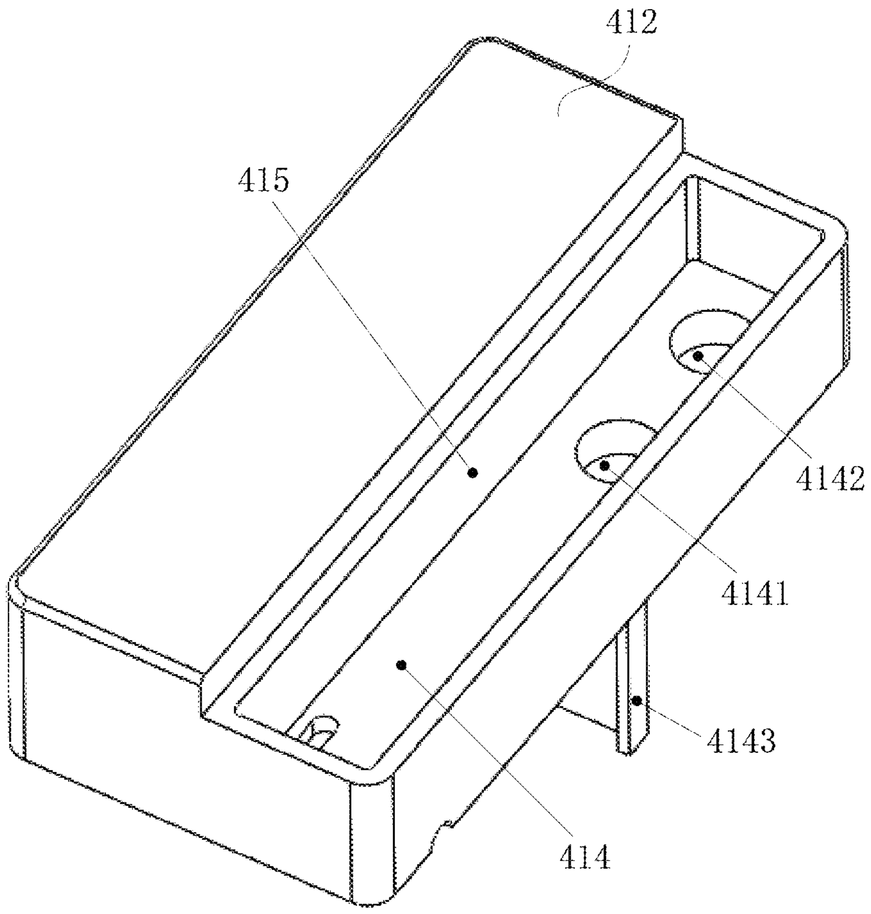
FIG. 8 is a first structural view of a first shell cover of the atomization generator of the present disclosure.

The atomization generator 4 will be described in detail below with reference to FIGS. 2 to 9. FIG. 5 is a sectional view of FIG. 2 taken along line B-B; FIG. 6 is a structural view of the atomization generator of the present disclosure after a second shell cover is removed; FIG. 7 is a sectional view of FIG. 2 taken along line A-A; FIG. 8 is a first structural view of a first shell cover of the atomization generator of the present disclosure; and FIG. 9 is a second structural view of the first shell cover of the atomization generator of the present disclosure.

As shown in FIGS. 2 to 4, in a possible embodiment, the shell 41 includes a shell body 411, a first shell cover 412, and a second shell cover 413. The partition 417 is provided in the shell body 411, and the partition 417 divides the shell body 411 into the atomization cavity 42 and the installation cavity 43 that communicate with each other. The liquid inlet 4112 and the mist outlet 4113 are provided on a bottom surface of the shell body 411 on a side corresponding to the atomization cavity 42, and the air inlet 4111 is provided on a side surface of the shell body 411 at a position corresponding to the installation cavity 43. A flow stabilizing plate 416 extends upward from the bottom surface of the atomization cavity 42. The flow stabilizing plate 416 is arranged between the liquid inlet 4112 and the ultrasonic atomization sheet 441. One side of the flow stabilizing plate 416 is fixedly connected to an inner wall of the atomization cavity 42, and the other side of the flow stabilizing plate 416 extends to another inner wall of the atomization cavity 42 and forms a gap with this inner wall for the liquid to flow out. With reference to FIG. 5, a bottom of the atomization cavity 42 is provided with a water-permeable hole (not shown in the figure), and the ultrasonic atomization sheet 441 is provided outside the shell body 411 and is sealedly connected at the water-permeable hole by a sealing member 443 in the atomization sheet holder 442 so that the liquid in the atomization cavity 42 can be atomized into water mist. Referring back to FIG. 4, the controller 47 is provided in the installation cavity 43 at a position right facing the air inlet 4111, the partition 417 has a notch 4171, and the notch 4171 is provided corresponding to the controller 47 on one side of the partition 417. A fan 48 is arranged between the air inlet 4111 and the controller 47. A suction port of the fan 48 is arranged corresponding to the air inlet 4111, and an exhaust port of the fan 48 is arranged toward the partition 417, so that the air from outside the shell body 411 is introduced into the shell body 411 by the fan 48 during operation. After the air flows through the controller 47, most of the air reaches the atomization cavity 42 through the notch 4171.

With reference to FIGS. 6 to 9, a communication cavity (not shown in the figure) independent from the atomization cavity 42 is also formed in the shell 41, the atomization cavity 42 communicates with the communication cavity through a first communication hole 4141, and the mist outlet 4113 communicates with the communication cavity through a connection pipe 46 and a second communication hole 4142, so that the air entering the atomization cavity 42 drives the steam obtained by atomization of the ultrasonic atomization sheet 441 to sequentially pass through the first communication hole 4141, the communication cavity, the second communication hole 4142 and the connection pipe before being discharged from the mist outlet 4113. That is, a complete air flow passage is formed between the air inlet 4111 and the mist outlet 4113 through the installation cavity 43, the notch 4171, the atomization cavity 42, the first communication hole 4141, the communication cavity, the second communication hole 4142 and the connection pipe, and the air flow passage flows through a part of the controller 47. Referring back to FIGS. 4 and 5, a drive circuit board 444 for driving the ultrasonic atomization sheet 441 is also installed in the atomization sheet holder 442, and the controller 47 is connected to the drive circuit board 444 and the fan 48 respectively to control the ultrasonic atomization sheet 441 and start and stop of the fan 48 respectively. A bottom surface of the installation cavity 43 is provided with a wire-passing hole (not shown in the figure) that allows the control wire 472 to pass through. One end of the control wire 472 is connected to the drive circuit board 444, and the other end is connected to the controller 47 through the wire-passing hole.

Figure 9:
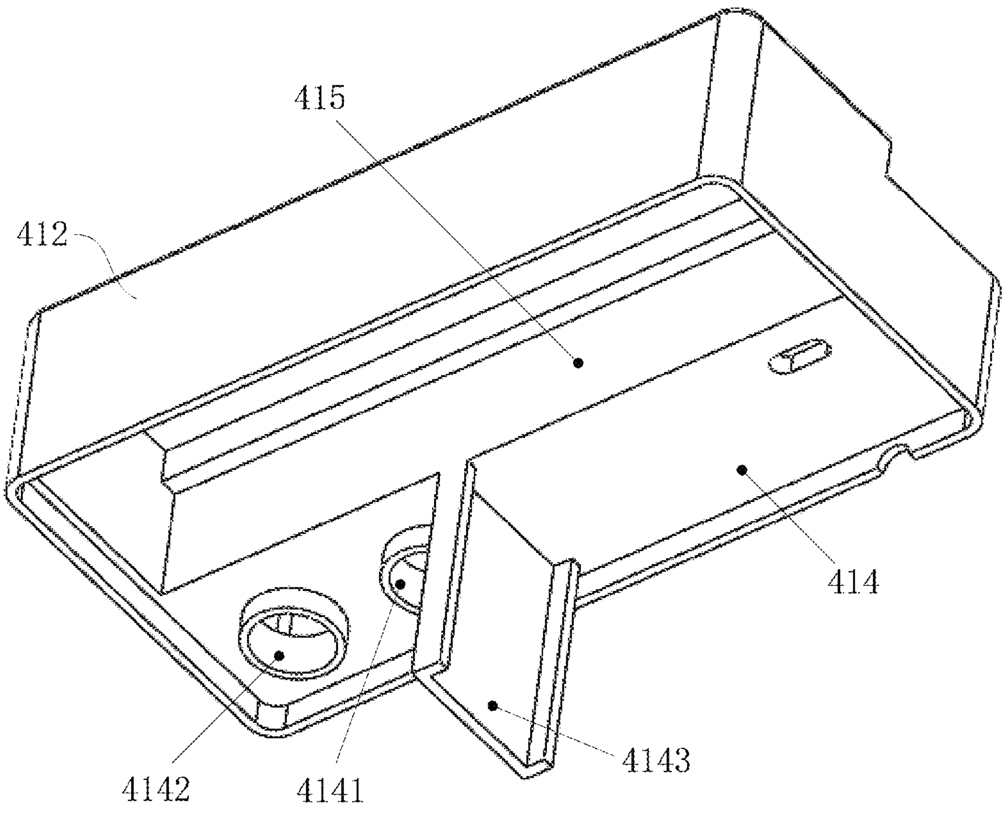
FIG. 9 is a second structural view of the first shell cover of the atomization generator of the present disclosure.

With reference to FIGS. 8 and 9, in a possible embodiment, the first shell cover 412 is provided with a transverse rib 414 and a vertical rib 415. The transverse rib 414 is fixedly connected to three successively adjacent inner side surfaces of the first shell cover 412, and the vertical rib 415 is fixedly connected to a top surface of the first shell cover 412 and two opposite ones of the above three successively adjacent inner side surfaces, so that the transverse rib 414, the vertical rib 415 and the three successively adjacent inner side surfaces jointly enclose the aforementioned communication cavity, on which the second shell cover 413 can be arranged. With reference to FIGS. 4, 7 and 8, the first communication hole 4141 and the second communication hole 4142 are provided on the transverse rib 414 at positions corresponding to the atomization cavity 42 and the mist outlet 4113. The atomization cavity 42 is connected to the communication cavity through the first communication hole 4141, and the mist outlet 4113 is connected to the second communication hole 4142 through the connection pipe 46. An air blocking plate 4143 also extends downward from a bottom surface of the transverse rib 414, the air blocking plate 4143 extends into the atomization cavity 42, and is arranged corresponding to the notch 4171.

With reference to FIGS. 6 and 7, in a possible embodiment, a valve mechanism 45 is also provided in the communication cavity, and the valve mechanism 45 is configured to able to seal the first communication hole 4141 and the second communication hole 4142 simultaneously. The valve mechanism 45 includes a drive part 451 and a sealing block 452. The controller 47 is connected to the drive part 451 to control start and stop of the drive part 451. The drive part 451 is connected to the sealing block 452 and can drive the sealing block 452 to slide back and forth in the communication cavity under the control of the controller 47. For example, the drive part 451 is an air cylinder, an electric cylinder or a linear motor, and an output shaft of the drive part 451 is fixedly connected to the sealing block 452, thereby driving the sealing block 452 to slide in the communication cavity. A bottom surface of the sealing block 452 can cover the first communication hole 4141 and the second communication hole 4142 simultaneously, and a relatively good sealing is maintained after the covering.

The advantage of the above arrangement is that by using the ultrasonic atomization sheet 441 as the atomization element, the principle of the ultrasonic atomization sheet 441 can be used to realize the integration of the liquid level detection function and the atomization function, which greatly simplifies the structure of the atomization generator 4; moreover, the measurement principle of the ultrasonic atomization sheet 441 determines that it is less affected by the density, viscosity, and temperature of the liquid during measurement, so the accuracy of liquid level measurement can be ensured. The flow stabilizing plate 416 is provided in the atomization cavity 42 at a position corresponding to the liquid inlet 4112. The liquid inlet 4112 and the ultrasonic atomization sheet 441 are spaced apart by the flow stabilizing plate 416, so that when the liquid enters the atomization cavity 42, the flow stabilizing plate 416 can also effectively suppress the splash generated when the liquid enters the atomization cavity 42, reduce fluctuation of the liquid level caused by the impact of water flow, and further improve the accuracy of detecting the liquid level by the ultrasonic atomization sheet 441. The shell body 411 is divided into the atomization cavity 42 and the installation cavity 43 by the partition 417, and the controller 47 is arranged in the installation cavity 43 and is connected to the drive circuit board 444, the drive part 451 and the fan 48 respectively, so that the atomization generator 4 of the present disclosure is highly integrated. The controller 47 can control the start and stop of the ultrasonic atomization sheet 441, the drive part 451, and the fan 48 simultaneously, which avoids separate wirings of the above-mentioned components when assembling the washing machine, and improves the assembly efficiency. The fan 48 is provided between the controller 47 and the air inlet 4111, the suction port of the fan 48 is arranged corresponding to the air inlet 4111, and the exhaust port of the fan 48 is arranged toward the partition 417. The partition 417 is provided with the notch 4171 at a position corresponding to the controller 47. When the atomization generator 4 is working, the airflow during the operation of the atomization generator 4 can also dissipate heat from the controller 47 when flowing through the controller 47, thereby improving the working life and working stability of the controller 47.

By arranging the communication cavity on the first cover and arranging the mist outlet 4113 on the bottom surface of the shell body 411, and then by connecting the mist outlet 4113 with the second communication hole 4142 by the connection pipe, a complete air flow passage is formed between the installation cavity 43, the atomization cavity 42, the communication cavity and the connection pipe, and in combination with the action of the fan 48, the discharge of water mist is made natural and strong. The mist outlet 4113 is arranged on the bottom surface of the shell 41 to facilitate the connection with the mist outlet pipe 7 so that the mist outlet pipe 7 can be connected to the outer cylinder 3 without bending, which shortens a spray stroke of the water mist and improves the spray effect of the water mist. The air blocking plate 4143 extends from the bottom surface of the transverse rib 414 in a way of corresponding to the notch 4171, so that the wind blown by the fan 48 bypasses after passing through the notch 4171, thereby improving the effect of carrying the water mist by the wind and achieving the purpose of rapid discharge of the water mist, thus avoiding a situation in which the wind blows out and the water mist remains in the atomization cavity 42. The ultrasonic atomization sheet 441 is sealedly arranged outside the shell body 411 through the atomization sheet holder 442, and the wire-passing hole is arranged in the installation cavity 43, so that the wiring of the control wire 472 does not pass through the atomization cavity 42, thus avoiding safety problems caused by the contact of the control wire 472 with water and improving the safety of the atomization generator 4.

The ultrasonic atomization sheet 441 is used as the atomization element, and the atomization generator 4 uses high-frequency oscillation of electrons (the oscillation frequency is 1.7 MHz or 2.4 MHz and other frequencies exceeding the auditory range, and the oscillation of electrons has no harm to human and animals). Through the high-frequency resonance of the atomization sheet, the molecular structure of the liquid water is broken up to produce a naturally flowing water mist. The water is atomized into ultrafine particles of 1 to 100 microns, being uniform, without heating or adding any chemical reagents. As compared with the heating atomization method, energy is saved by 90%. In addition, a large amount of negative ions will be released during the atomization process, which will react electrostatically with smoke and dust floating in the air to precipitate them. At the same time, harmful substances such as formaldehyde, carbon monoxide, bacteria can be effectively removed, and micron-level water molecules can be adsorbed on the clothing faster, making the clothing caring experience better.

By providing the communication cavity in the atomization generator 4 and providing the valve mechanism 45 in the communication cavity, the operating safety of the washing machine can be greatly improved, and the humid and hot air can be effectively prevented from flowing back to the atomization generator 4 and the interior of the washing machine when the drying module 5 is started, which would otherwise cause short-circuit of the electrical components due to wetting. Specifically, the communication cavity independent from the atomization cavity 42 is provided in the shell 41, and the atomization cavity 42 communicates with the mist outlet 4113 through the communication cavity, so that the communication cavity becomes a passage way which must be passed through by the water mist for reaching the mist outlet 4113 from the atomization cavity 42. The valve mechanism 45 is provided in the communication cavity, and the valve mechanism 45 can seal the first communication hole 4141 and the second communication hole 4142, so that the valve mechanism 45 can cut off the passage completely, thereby preventing the outside air from flowing back into the atomization generator 4 from the mist outlet 4113; in particular, when the drying module 5 of the washing machine is started, the humid air in the washing tub can be blocked from flowing back to the atomization generator 4 and then being discharged to the interior of the washing machine from the air inlet 4111. This prevents the occurrence of faults such as short-circuit of the electrical components in the atomization generator 4 and the washing machine due to wetting, which greatly improves the operational safety of the washing machine. Moreover, the above arrangement has high feasibility and outstanding effect, which is advantageous for large-scale promotion and use.

It should be noted that the above preferred embodiments are only used to illustrate the principle of the present disclosure, and are not intended to limit the scope of protection of the present disclosure. Without departing from the principle of the present disclosure, those skilled in the art can adjust the above arrangements so that the present disclosure can be applied to a more specific application scene.

For example, in an alternative embodiment, the arrangement of the valve mechanism 45 is not invariable, and those skilled in the art may adjust it as long as it can seal the first communication hole 4141 and/or the second communication hole 4142. For example, an ordinary motor may also be selected as the drive part 451, and a transmission member is added between the drive part 451 and the sealing block 452 to complete the reciprocating sliding of the sealing block 452. For example, the transmission member may be a ball screw. For another example, the sealing block 452 may also be configured to seal only one of the first communication hole 4141 and the second communication hole 4142, which can also achieve the function of preventing the backflow of humid and hot air.

For another example, in another alternative embodiment, the fan 48 may not be provided on the shell body 411, but the fan 48 is provided inside the shell body 411 or at other positions, as long as the position enables the water mist to be effectively discharged from the atomization cavity 42. For example, the fan 48 may also be arranged on the mist outlet pipe 7, etc.

For another example, in another alternative embodiment, those skilled in the art can may adjust the position of arranging the communication cavity, as long as the arrangement of the communication cavity can make the communication cavity independent from the atomization cavity 42. For example, the communication cavity may also be provided inside the shell body 411 instead of being provided on the first shell cover 412.

For another example, in another alternative embodiment, the position of the mist outlet 4113 is not unique, and it may also be arranged on the side wall of the shell body 411, on the first shell cover 412 or on the second shell cover 413, etc. Correspondingly, it is only necessary to adjust the positions of arranging the second communication hole 4142 and the connection pipe 46. This adjustment of the position of arranging the mist outlet 4113 does not deviate from the principle of the present disclosure.

For another example, in another alternative embodiment, the way and position of arranging the flow stabilizing plate 416 can be adjusted, as long as the adjustment can reduce fluctuation of the liquid level when the liquid enters the atomization cavity 42. For example, the flow stabilizing plate 416 may also be arranged on the inner wall of the atomization cavity 42 or on the first shell cover, and a certain gap is left between the lower side and the atomization cavity 42.

Of course, the above alternative embodiments, as well as the alternative embodiments and the preferred embodiments, can also be used in combination with each other, so as to obtain new embodiments that are suitable for a more specific application scene.

The control method for the drum washing machine of the present disclosure will be described below with reference to FIG. 10, which is a flowchart of the control method for the drum washing machine of the present disclosure.

Figure 10:
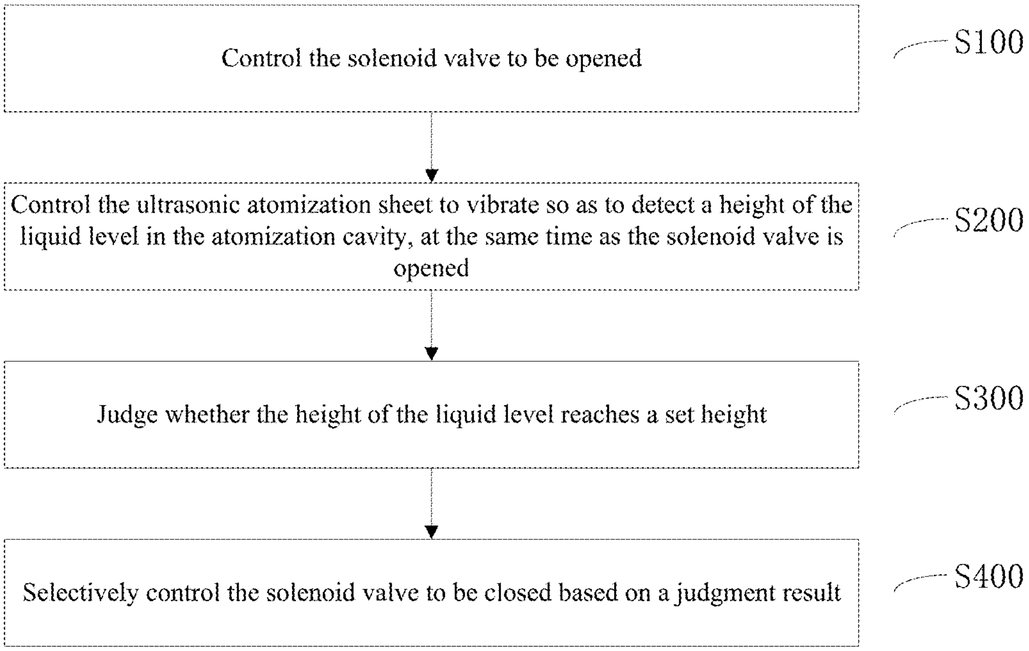
FIG. 10 is a flowchart of a method for controlling an atomization generator of the present disclosure.

As shown in FIG. 10, the control method for the drum washing machine of the present disclosure mainly includes:

S100: controlling the solenoid valve 8 to be opened. For example, after the user selects related functions such as steam washing of the drum washing machine, the control unit 9 controls the solenoid valve 8 to be opened to inject water into the atomization cavity 42;

S200: at the same time as the solenoid valve 8 is opened, controlling the ultrasonic atomization sheet 441 to vibrate so as to detect a height of the liquid level in the atomization cavity 42. For example, at the same time as the solenoid valve 8 is opened, the controller 47 controls the drive circuit board 444 to be connected, the drive circuit board 444 drives the ultrasonic atomization sheet 441 to work, and the ultrasonic atomization sheet 441 detects the height of the liquid level in the atomization cavity 42 through vibration; of course, the detection timing of the ultrasonic atomization sheet 441 can be adjusted; for example, after the solenoid valve 8 has been opened for a certain period of time, the ultrasonic atomization sheet 441 is controlled to vibrate to detect the height of the liquid level in the atomization cavity 42.

S300: judging whether the height of the liquid level reaches a set height. For example, the set height is a height calculated based on the weight of the clothing or a height set in advance. At the same time as the ultrasonic atomization sheet 441 detects the height of the liquid level, it is judged whether the height of the liquid level reaches the set height;

S400: selectively controlling the solenoid valve 8 to be closed based on a judgment result; for example, if the height of the liquid level reaches the set height, the solenoid valve 8 is controlled to be closed, and if the height of the liquid level does not reach the set height, the ultrasonic atomization sheet 441 continuously detects the height of the liquid level.

Through the above control method, the drum washing machine of the present disclosure can use the ultrasonic atomization sheet 441 to detect the height of the liquid level, which improves the accuracy of liquid level measurement, and thereby improves the control accuracy of the drum washing machine.

Hereinafter, referring to FIGS. 1 to 10, a working process of the drum washing machine in a possible embodiment will be described.

In a possible embodiment, after the user selects the steam washing option on a control panel of the drum washing machine, the solenoid valve 8 is opened, and water enters the atomization cavity 42. The ultrasonic atomization sheet 441 first detects the height of the liquid level. After the liquid level reaches the set height, the solenoid valve 8 is closed, and the controller 47 controls the drive circuit board 444 and the fan 48 to start at the same time. The ultrasonic atomization sheet 441 atomizes the water in the atomizing cavity 42, and at the same time, the fan 48 introduces the outside air into the installation cavity 43 through the air inlet 4111. After flowing through the controller 47 to cool the controller 47, the air flows into the atomization cavity 42 through the notch 4171, and drives the steam generated by atomization of the ultrasonic atomization sheet to sequentially pass through the first communication hole 4141, the communication cavity, the second communication hole 4142, the connection pipe, the mist outlet 4113 and the mist outlet pipe 7 before being sprayed into the inner cylinder 2 to treat the clothing.

Hitherto, the technical solutions of the present disclosure have been described in conjunction with the preferred embodiments shown in the accompanying drawings, but it is easily understood by those skilled in the art that the scope of protection of the present disclosure is obviously not limited to these specific embodiments. Without departing from the principles of the present disclosure, those skilled in the art can make equivalent changes or replacements to relevant technical features, and all the technical solutions after these changes or replacements will fall within the scope of protection of the present disclosure.

What is claimed is:

1. An atomization generator, comprising:

a shell, wherein the shell is provided therein with an atomization cavity capable of containing a liquid, and the shell is provided thereon with a liquid inlet, an air inlet and a mist outlet, all of which communicate with the atomization cavity; and an atomization module, wherein the atomization module comprises an ultrasonic atomization sheet, and the atomization module is configured to be capable of atomizing the liquid in the atomization cavity through vibration of the ultrasonic atomization sheet and detecting a height of liquid level in the atomization cavity through the vibration, wherein detecting a height of liquid level in the atomization cavity through the vibration comprises:

the ultrasonic atomization sheet working at a lower working frequency and emitting pulsed ultrasonic waves which are reflected by a surface of the liquid and then received by the ultrasonic atomization sheet, and the height of the liquid level being calculated based on the time from emission to reception of the ultrasonic waves.

2. The atomization generator according to claim 1, wherein:

a water-permeable hole is provided at a bottom of the shell, the atomization module further comprises an atomization sheet holder, and the ultrasonic atomization sheet is sealedly fixed to an outer part of the shell through the atomization sheet holder at a position corresponding to the water-permeable hole.

3. The atomization generator according to claim 2, wherein a partition is provided in the shell, and the partition divides the shell into an installation cavity and the atomization cavity;

wherein the installation cavity is provided therein with a controller; and wherein the atomization module further comprises a drive circuit board for driving the ultrasonic atomization sheet, the drive circuit board is installed on the atomization sheet holder, and the controller is connected to the drive circuit board.

4. The atomization generator according to claim 3, wherein the air inlet is arranged on the shell at a position corresponding to the installation cavity; and/or a fan is equipped at the air inlet, and the controller is further connected to the fan to control start and stop of the fan.

5. The atomization generator according to claim 3, wherein a communication cavity is further provided in the shell, the atomization cavity communicates with the communication cavity through a first communication hole, and the mist outlet communicates with the communication cavity through a second communication hole.

6. The atomization generator according to claim 5, wherein the mist outlet is arranged on a bottom surface of the shell, the atomization generator further comprises a connection pipe, and the mist outlet communicates with the second communication hole through the connection pipe; and/or a valve mechanism is further provided in the communication cavity, the valve mechanism is configured to be capable of sealing the first communication hole and/or the second communication hole, and the controller is connected to the valve mechanism to control opening and closing of the valve mechanism.

7. The atomization generator according to claim 1, wherein the liquid inlet is provided on a bottom surface of the atomization cavity; and wherein a flow stabilizing plate corresponding to the liquid inlet is further provided in the atomization cavity, and the flow stabilizing plate isolates the liquid inlet from the ultrasonic atomization sheet.

8. The atomization generator according to claim 7, wherein the flow stabilizing plate is formed by extending upward from the bottom surface of the atomization cavity, one side of the flow stabilizing plate is fixedly connected to one inner wall of the atomization cavity, and the other side of the flow stabilizing plate extends to another inner wall of the atomization cavity and forms a gap with said other inner wall.

9. A clothing treatment apparatus comprising:

a cabinet, a washing tub arranged in the cabinet, and an atomization generator, wherein the atomization generator comprises a shell and an atomization module, wherein the shell is provided therein with an atomization cavity capable of containing a liquid, and the shell is provided thereon with a liquid inlet, an air inlet and a mist outlet, all of which communicate with the atomization cavity, the liquid inlet communicates with a water source through a liquid inlet pipe and a solenoid valve, and the mist outlet communicates with the washing tub through a mist outlet pipe, wherein the atomization module comprises an ultrasonic atomization sheet, wherein the liquid inlet is provided on a bottom surface of the atomization cavity, a flow stabilizing plate corresponding to the liquid inlet is further provided in the atomization cavity, and the flow stabilizing plate isolates the liquid inlet from the ultrasonic atomization sheet;

wherein when a liquid level of the liquid needs to be measured, the ultrasonic atomization sheet works at a lower working frequency, and emits pulsed ultrasonic waves which are reflected by a surface of the liquid and then received by the ultrasonic atomization sheet, and the height of the liquid level is calculated based on the time from emission to reception of the ultrasonic waves; and wherein when atomization is required, the ultrasonic atomization sheet works at a higher frequency to atomize the liquid.

10. A method for controlling a clothing treatment apparatus, wherein the clothing treatment apparatus comprises a cabinet, as well as a washing tub and an atomization generator that are arranged in the cabinet; and wherein the atomization generator comprises a shell and an atomization module, the shell is provided therein with an atomization cavity capable of containing a liquid, and the shell is provided thereon with a liquid inlet, an air inlet and a mist outlet, all of which communicate with the atomization cavity; the liquid inlet communicates with a water source through a liquid inlet pipe and a solenoid valve, the mist outlet communicates with the washing tub through a mist outlet pipe, and the atomization module comprises an ultrasonic atomization sheet which is capable of detecting a liquid level of the liquid in the atomization cavity through vibration and atomizing the liquid in the atomization cavity;

the control method comprising:

controlling the solenoid valve to be opened;

at the same time as or after the solenoid valve is opened, controlling the ultrasonic atomization sheet to vibrate so as to detect a height of the liquid level in the atomization cavity;

judging whether the height of the liquid level reaches a set height; and selectively controlling the solenoid valve to be closed based on a judgment result, wherein detecting the height of the liquid level in the atomization cavity comprises:

the ultrasonic atomization sheet working at a lower working frequency and emitting pulsed ultrasonic waves which are reflected by a surface of the liquid and then received by the ultrasonic atomization sheet, and the height of the liquid level being calculated based on the time from emission to reception of the ultrasonic waves.

* * * * *